United States Patent
Nakano

(10) Patent No.: US 10,126,115 B2
(45) Date of Patent: Nov. 13, 2018

(54) TRIANGULATION DEVICE, TRIANGULATION METHOD, AND RECORDING MEDIUM RECORDING PROGRAM THEREFOR

(71) Applicant: NEC Corporation, Minato-ku, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 15/510,737

(22) PCT Filed: Sep. 18, 2015

(86) PCT No.: PCT/JP2015/004798
§ 371 (c)(1),
(2) Date: Mar. 13, 2017

(87) PCT Pub. No.: WO2016/042779
PCT Pub. Date: Mar. 24, 2016

(65) Prior Publication Data
US 2017/0254637 A1    Sep. 7, 2017

(30) Foreign Application Priority Data

Sep. 18, 2014  (JP) .............................. 2014-190242

(51) Int. Cl.
*G06K 9/00* (2006.01)
*G01B 11/00* (2006.01)
(Continued)

(52) U.S. Cl.
CPC .............. *G01B 11/002* (2013.01); *G01C 3/08* (2013.01); *G06T 7/73* (2017.01); *G06T 2200/04* (2013.01)

(58) Field of Classification Search
None
See application file for complete search history.

(56) References Cited

U.S. PATENT DOCUMENTS

| 2009/0238426 A1* | 9/2009 | Fear ..................... G06K 9/3216 382/128 |
| 2012/0301011 A1* | 11/2012 | Grzechnik ............ G06T 7/0044 382/154 |
| 2014/0009582 A1 | 1/2014 | Suzuki |

FOREIGN PATENT DOCUMENTS

| EP | 2682710 A1 | 1/2014 |
| JP | 2014-013147 A | 1/2014 |
| JP | 2014-096761 A | 5/2014 |

OTHER PUBLICATIONS

Lindstrom, "Triangulation Made Easy", Lawrence Livermore National Laboratory, IEEE Computer Vision and Pattern Recognition 2011, 2010, pp. 1554-1561, (8 pages total).

(Continued)

*Primary Examiner* — Sean Conner

(57) ABSTRACT

A triangulation device for computing a three-dimensional position of a measurement target point using a stereo method, the triangulation device includes: optimum image coordinate estimation unit configured to, based on coordinates of corresponding points corresponding to the measurement target point in two images each of which including an image of the measurement target point, and intrinsic parameters and extrinsic parameters of optical instruments generating the two images, calculate correction vectors by which coordinates of the corrected corresponding points satisfy an epipolar equation composed of the intrinsic parameters and the extrinsic parameters, using a characteristic polynomial including a correction amount of coordinates of the corresponding points or a reciprocal of the correction amount as a variable, and compute coordinates of the corrected corresponding points based on calculated correction vectors; and three-dimensional coordinate calculation unit configured to calculate three-dimensional coordinates of the measurement target point based on coordinates of the corrected corre- (Continued)

sponding points, the intrinsic parameters and the extrinsic parameters.

10 Claims, 12 Drawing Sheets

(51) Int. Cl.
    *G01C 3/08*     (2006.01)
    *G06T 7/73*     (2017.01)

(56) References Cited

OTHER PUBLICATIONS

Hartley, R. I., et al. "Triangulation," International Journal of Computer Vision and Image Understanding. vol. 68, No. 2, Nov. 1997, pp. 146-157, (12 pages total).
Yamada, K., et al. "Latest Algorithm for 3-D Reconstruction from Two Views," IEICE Technical Report, Aug. 24, 2009, vol. 109, No. 182, pp. 95-102, (11 pages total).
Kanatani, K., et al., "Triangulation from Two Views: Hartley-Sturm vs. Optimal Correction," IEICE Technical Report, Mar. 3, 2008, vol. 107, No. 539, pp. 335-342, (10 pages total).
Sato, A., "Computer Vision: Geometry of Vision," Corona Publishing, May 7, 1999, pp. 122-123 (4 pages total).
Xu, G., et al., "3D CG from Photographs," Kindai kagaku sha, Jan. 30, 2001, Epipolar Geometry in Stereo, Motion and Object Recognition: A Unified Approach, pp. 69-73, (8 pages total).
International Search Report, issued by International Searching Authority in corresponding International Application No. PCT/JP2015/004798, dated Mar. 24, 2016.

\* cited by examiner

Fig.4

$$\underset{\Delta x, \Delta x'}{\text{minimize}} \; \|\Delta x\|^2 + \|\Delta x'\|^2$$

$$\text{subject to } [\Delta x'^T, 1] \underline{F} \begin{bmatrix} \Delta x \\ 1 \end{bmatrix} = 0$$

··· EQUATION 1

WHERE $$\underline{F} = T'^T F T$$

$$T = \begin{bmatrix} I_{2 \times 2} & x \\ O_{1 \times 2} & 1 \end{bmatrix}$$

$$T' = \begin{bmatrix} I_{2 \times 2} & x' \\ O_{1 \times 2} & 1 \end{bmatrix}$$

$$F = K'^{-T} [t']_\times R' K^{-1}$$

Fig.5

$$[\Delta x^T, \Delta x'^T, 1] \begin{bmatrix} A & b \\ b^T & c \end{bmatrix} \begin{bmatrix} \Delta x \\ \Delta x' \\ 1 \end{bmatrix} = 0$$

··· EQUATION 2

WHERE ASSUMING THAT $F_{i,j}$ DENOTES (i,j) ELEMENT OF F, $$A = \begin{bmatrix} 0 & 0 & F_{1,1} & F_{2,1} \\ 0 & 0 & F_{1,2} & F_{2,2} \\ F_{1,1} & F_{1,2} & 0 & 0 \\ F_{2,1} & F_{2,2} & 0 & 0 \end{bmatrix}$$

$$b = \begin{bmatrix} F_{3,1} \\ F_{3,2} \\ F_{1,3} \\ F_{2,3} \end{bmatrix}$$

$$\underset{v}{\text{minimize}} \; \|v\|^2$$

$$\text{subject to } [v^T, k] \begin{bmatrix} A & b \\ b^T & c \end{bmatrix} \begin{bmatrix} v \\ k \end{bmatrix} = 0$$

··· EQUATION 3

$$L(v, k, \lambda) = \|v\|^2 - \lambda [v^T, k] \begin{bmatrix} A & b \\ b^T & c \end{bmatrix} \begin{bmatrix} v \\ k \end{bmatrix}$$

··· EQUATION 4

WHERE $\lambda$ DENOTES LAGRANGE MULTIPLIER $$\|v\|^2 = \lambda^2 \|Dv\|^2$$

··· EQUATION 10

Fig.7

$$\det(D) = \frac{1}{E_{3,3}} (E_{1,1} E_{2,2} - E_{1,2} E_{2,1}) \det(E) = 0$$

TRIANGULATION DEVICE, TRIANGULATION METHOD, AND RECORDING MEDIUM RECORDING PROGRAM THEREFOR

This application is a National Stage Entry of PCT/JP2015/004798 filed on Sep. 18, 2015, which claims priority from Japanese Patent Application 2014-190242 filed on Sep. 18, 2014, the contents of all of which are incorporated herein by reference, in their entirety.

TECHNICAL FIELD

The disclosed subject matter relates to a triangulation device and the like that compute a three-dimensional position of a measurement target point using a stereo method.

BACKGROUND ART

Triangulation refers to capturing a measurement target point by two calibrated cameras from different positions, and estimating optimum three-dimensional coordinates of the measurement target point from a point corresponding to the measurement target point (hereinafter simply referred to as a corresponding point) in each image. Calibrated means that an intrinsic parameter, such as a focal length and an optical center of each camera, and an extrinsic parameter, such as a position and an attitude of each camera, are known.

The optimum three-dimensional coordinates refer to a point at which a sum of squares of each distance between two-dimensional image coordinates obtained by projecting estimated three-dimensional coordinates onto each camera, and image coordinates of an observed corresponding point (hereinafter simply referred to as a reprojection error) is minimum. Obtaining a point at which a reprojection error is minimum is equivalent to obtaining a point at which each line passing through a center of each camera and a corresponding point intersects each other in a three-dimensional space. At this time, it is known that a relative geometric relation between the corresponding points and the respective cameras satisfies a constraint called an epipolar equation. When the corresponding points satisfy the epipolar equation, optimum three-dimensional coordinates can be obtained by a linear least squares method. However, an observed corresponding point contains an error due to influence of various types of noise such as a sensor, and therefore the epipolar equation is generally not satisfied, and three-dimensional coordinates estimated by the linear least squares method are not optimum.

A method called a bundle adjustment method is widely known as a common method for estimating three-dimensional coordinates. The bundle adjustment method estimates optimum three-dimensional coordinates by minimizing a reprojection error by an unconstrained nonlinear optimization method such as Levenberg-Marquardt method, with non-optimum three-dimensional coordinates obtained by a linear least squares method as initial values. For example, NPLs 1 and 2 describe methods of estimating initial values by a linear least squares method.

NPLs 3, 4, and 5 propose schemes of correcting coordinates of each corresponding point instead of directly optimizing three-dimensional coordinates. Specifically, coordinates of optimum corresponding points satisfying an epipolar equation are first obtained, and optimum three-dimensional coordinates are subsequently estimated by a linear least squares method. Then, in NPL 3, calculation of a globally optimum correction amount depends on a sixth-degree polynomial using single-variable.

It is known that the optimum correction amount is equivalent to a reprojection error. By contrast, in NPLs 4 and 5, a scheme of calculating a correction amount of each corresponding point by iteration of linear computations without solving a sixth-degree equation, by applying first-order approximation to an epipolar equation primarily being a quadratic expression, is proposed.

CITATION LIST

Non Patent Literature

[NPL 1] Gang Xu, "3D CG from Photographs," Kindai kagaku sha, 2001, pp. 69 to 73
[NPL 2] Atsushi Sato, "Computer Vision: Geometry of Vision," Corona Publishing, 1999, pp. 122 and 123
[NPL 3] R. Hartley and P. Sturm, "Triangulation," International Journal of Computer Vision and Image Understanding, vol. 68, Issue 2, pp. 146 to 157, 1997
[NPL 4] Kanatani, Sugaya, Niitsuma, "Triangulation from Two Views: Hartley-Sturm vs. Optimal Correction," IEICE Technical Report, Image Engineering, vol. 107, no. 538, pp. 225 pp. 335 to 342, 2008
[NPL 5] P. Lindstrom, "Triangulation Made Easy," IEEE Computer Vision and Pattern Recognition, 2010, pp. 1554 to 1561, 2010

SUMMARY OF INVENTION

Technical Problem

In a triangulation method by a bundle adjustment method, a search range of three-dimensional coordinates by an unconstrained nonlinear optimization method is an entire infinite three-dimensional space, and therefore there is a possibility of convergence to a local solution that is not globally optimum. In other words, undesirable three-dimensional coordinates may be estimated.

The triangulation method described in NPL 3 is always able to estimate globally optimum three-dimensional coordinates. However, a sixth-degree equation used in the triangulation method is generally not able to express a solution by a finite number of algebraic computations (hereinafter simply referred to as a closed form) as is the case with a second degree equation. Accordingly, a solution cannot be obtained unless an iterative method such as Durand-Kerner-Aberth (DKA) method and an eigenvalue decomposition method is used. When a computational amount becomes large, especially when corresponding points becomes large in number, increase in the computational amount becomes a problem in the triangulation method in NPL 3.

A computational amount for each iteration in the triangulation methods described in NPLs 4 and 5 is much smaller than for the method used in NPL 3. Accordingly, a computational amount is small, and, even when the number of corresponding points becomes large, processing can be performed in a less calculation time than NPL 3. However, the triangulation methods in NPLs 4 and 5 are approximate methods of NPL 3, and therefore there is no guarantee that globally optimum three-dimensional coordinates are obtained.

Thus, when computing a three-dimensional position of a measurement target point using a stereo method, it is difficult to output the three-dimensional position without increasing a computational amount.

Object of Invention

An object of the disclosed subject matter is to provide a triangulation device and the like that solve the problem described above.

Solution to Problem

A triangulation device for computing a three-dimensional position of a measurement target point using a stereo method, the triangulation device includes: optimum image coordinate estimation unit configured to, based on coordinates of corresponding points corresponding to the measurement target point in two images each of which including an image of the measurement target point, and intrinsic parameters and extrinsic parameters of optical instruments generating the two images, calculate correction vectors by which coordinates of the corrected corresponding points satisfy an epipolar equation composed of the intrinsic parameters and the extrinsic parameters, using a characteristic polynomial including a correction amount of coordinates of the corresponding points or a reciprocal of the correction amount as a variable, and compute coordinates of the corrected corresponding points based on calculated correction vectors; and three-dimensional coordinate calculation unit configured to calculate three-dimensional coordinates of the measurement target point based on coordinates of the corrected corresponding points, the intrinsic parameters and the extrinsic parameters.

A triangulation method according to a second aspect to the disclosed subject matter, for computing a three-dimensional position of a measurement target point using a stereo method, the triangulation method including:
calculating correction vectors by which coordinates of the corrected corresponding points satisfy an epipolar equation composed of the intrinsic parameters and the extrinsic parameters, based on a third-degree polynomial including a correction amount of coordinates of the corresponding points or a reciprocal of the correction amount as a variable;
computing coordinates of the corrected corresponding points; and
calculating three-dimensional coordinates of the measurement target point, with coordinates of the corrected corresponding points, the intrinsic parameters and the extrinsic parameters as inputs.

A non-transitory computer-readable recording medium storing a program according to a third aspect of the disclosed subject matter, causing a computer that computes a three-dimensional position of a measurement target point using a stereo method, to function as:
optimum image coordinate estimation means configured to
receive coordinates of corresponding points corresponding to the measurement target point in two images each of which including an image of the measurement target point, and intrinsic parameters and extrinsic parameters of optical instruments generating the two images,
calculate correction vectors by which coordinates of the corrected corresponding points satisfy an epipolar equation composed of the intrinsic parameters and the extrinsic parameters, based on a characteristic polynomial including a correction amount of coordinates of the corresponding points or a reciprocal of the correction amount as a variable, and
compute coordinates of the corrected corresponding points based on calculated correction vectors; and
three-dimensional coordinate calculation means configured to
calculate three-dimensional coordinates of the measurement target point based on coordinates of the corrected corresponding points, the intrinsic parameters and the extrinsic parameters.

Advantageous Effects of Invention

When computing a three-dimensional position of a measurement target point using a stereo method, the disclosed subject matter is able to output the three-dimensional position without increasing a computational amount.

BRIEF DESCRIPTION OF DRAWINGS

FIG. 4 is a diagram indicating mathematical expressions used in the triangulation device according to the first example embodiment.

FIG. 5 is a diagram indicating mathematical expressions used in the triangulation device according to the first example embodiment.

FIG. 6 is a diagram indicating mathematical expressions used in the triangulation device according to the first example embodiment.

FIG. 7 is a diagram indicating a mathematical expression used in the triangulation device according to the first example embodiment.

DESCRIPTION OF EMBODIMENTS

First Example Embodiment

Figure 1:
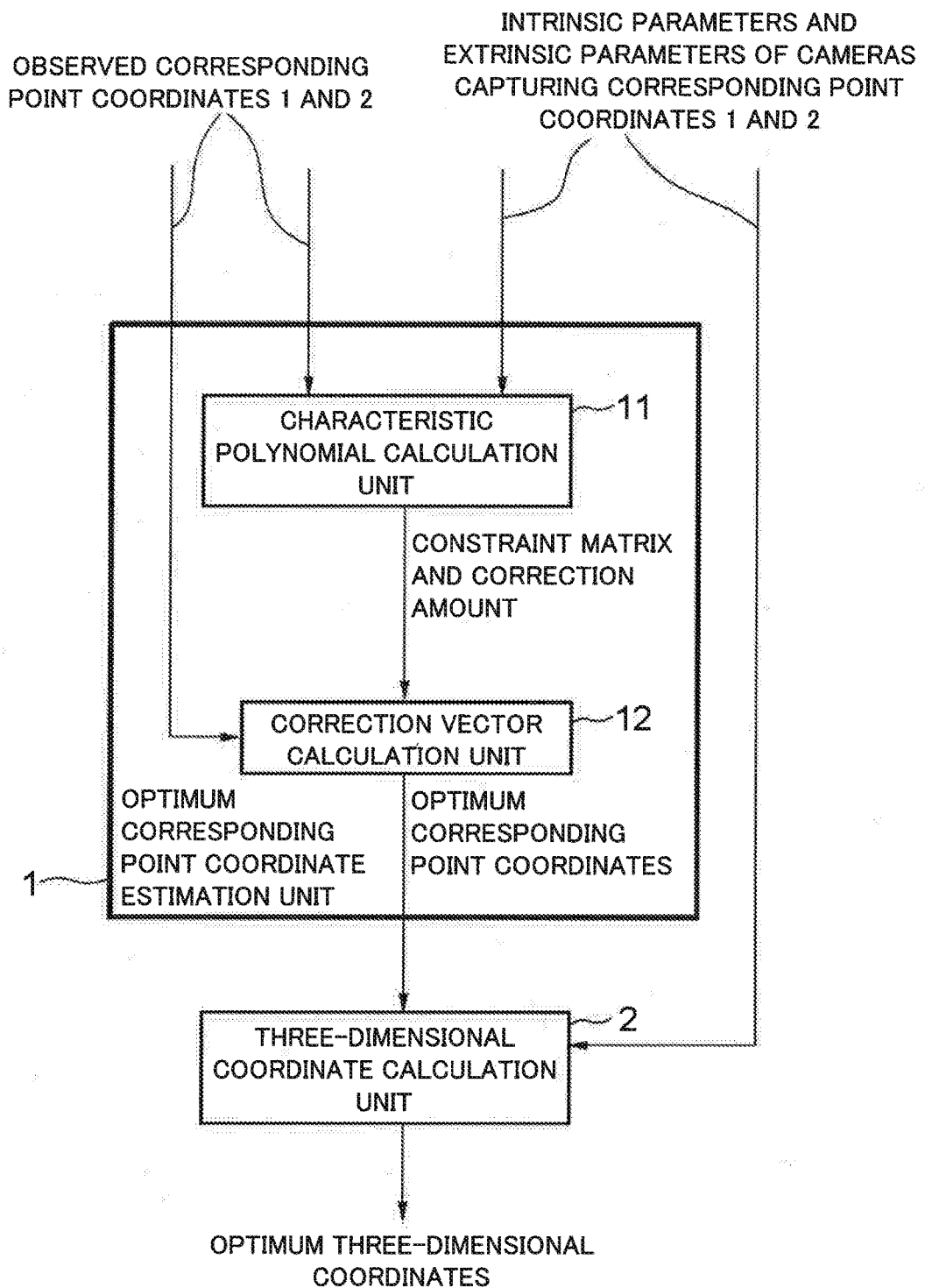
FIG. 1 is a block diagram illustrating a configuration of a triangulation device according to a first example embodiment.

Next, a first example embodiment of the disclosed subject matter will be described in detail with reference to drawings.
[Description of Configuration]
FIG. 1 is a block diagram illustrating a configuration of a triangulation device according to the first example embodiment. A direction of an arrow in the drawing illustrates an example, and does not limit a direction of a signal between blocks. The above holds for block diagrams according to second, third, and fourth example embodiments. The triangulation device illustrated in FIG. 1 includes an optimum corresponding point coordinate estimation unit 1 and a three-dimensional coordinate calculation unit 2. The optimum corresponding point coordinate estimation unit 1 includes a characteristic polynomial calculation unit 11 and a correction vector calculation unit 12.

The optimum corresponding point coordinate estimation unit 1 receives image coordinates of a pair of corresponding points in two images, and intrinsic parameters and extrinsic parameters of cameras capturing the corresponding points. Then, the optimum corresponding point coordinate estimation unit 1 calculates correction vectors by which corrected corresponding points satisfy an epipolar equation composed of the intrinsic parameters and the extrinsic parameters, the epipolar equation using a correction amount of the corresponding points or a reciprocal of the correction amount as a variable.

The characteristic polynomial calculation unit 11 receives corresponding points, intrinsic parameters and extrinsic parameters, and calculates a predetermined constraint matrix indicating a constraint to be satisfied by correction vectors. The correction vector includes a correction amount of the corresponding points or a reciprocal of the correction amount as an eigenvalue. Subsequently, the characteristic polynomial calculation unit 11 solves a characteristic equation of the constraint matrix to compute a minimum correction amount and outputs the constraint matrix and the minimum correction amount to the correction vector calculation unit 12.

Receiving image coordinates of corresponding points, and a constraint matrix and a minimum correction amount that are output by the characteristic polynomial calculation unit 11 as inputs, the correction vector calculation unit 12 calculates an eigenvector of the constraint matrix corresponding to the minimum correction amount. Subsequently, the correction vector calculation unit 12 performs predetermined scaling on the eigenvector to calculate correction vectors, calculates image coordinates of optimum corresponding points from the correction vectors, and outputs the coordinates to the three-dimensional coordinate calculation unit 2.

Receiving image coordinates of corrected optimum corresponding points, intrinsic parameters and extrinsic parameters as inputs, the three-dimensional coordinate calculation unit 2 calculates three-dimensional coordinates of the corresponding point by a linear least squares method, and outputs the calculated coordinates.

The optimum corresponding point coordinate estimation unit 1 (more specifically, the characteristic polynomial calculation unit 11 and the correction vector calculation unit 12) and the three-dimensional coordinate calculation unit 2, according to the present example embodiment, are provided by, for example, hardware designed to perform specific computation processing, or an information processing device such as a central processing unit (CPU) that operates in accordance with a program.

[Description of Operation]

Figure 2:
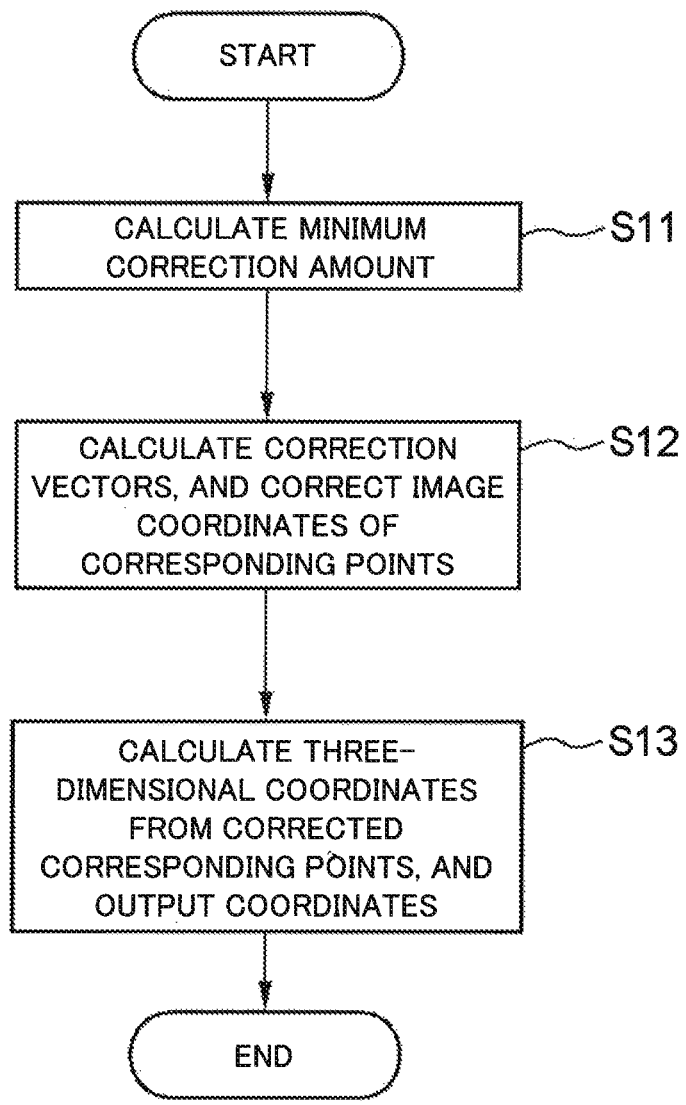
FIG. 2 is a flowchart illustrating an example of an operation of the triangulation device according to the first example embodiment.

Next, an operation of the triangulation device according to the present example embodiment will be described. FIG. 2 is a flowchart illustrating an example of the operation of the triangulation device according to the first example embodiment of the disclosed subject matter.

First, image coordinates of a pair of corresponding points in two images, and intrinsic parameters and extrinsic parameters of cameras capturing the corresponding points are supplied to the characteristic polynomial calculation unit 11. The characteristic polynomial calculation unit 11 calculates a predetermined constraint matrix indicating a constraint to be satisfied by correction vectors. The correction vectors include a correction amount of corresponding points or a reciprocal of the correction amount as an eigenvalue. Subsequently, the characteristic polynomial calculation unit 11 solves a characteristic equation of the constraint matrix to compute a minimum correction amount, and outputs the constraint matrix and the minimum correction amount to the correction vector calculation unit 12 (Step S11).

Next, when image coordinates of the corresponding points, and the constraint matrix and the minimum correction amount that are output from the characteristic polynomial calculation unit 11, are supplied to the correction vector calculation unit 12, the correction vector calculation unit 12 calculates an eigenvector of the constraint matrix corresponding to the minimum correction amount. Subsequently, the correction vector calculation unit 12 performs predetermined scaling on the eigenvector to calculate correction vectors, calculates image coordinates of optimum corresponding points from the correction vectors, and outputs the coordinates to the three-dimensional coordinate calculation unit 2 (Step S12).

Next, when the image coordinates of the corrected optimum corresponding points, the intrinsic parameters and the extrinsic parameters are supplied, the three-dimensional coordinate calculation unit 2 calculates three-dimensional coordinates of the corresponding point by a linear least squares method and outputs the calculated coordinates (Step S13).

The first example embodiment will be described more in detail below using a specific example.

Figure 3:
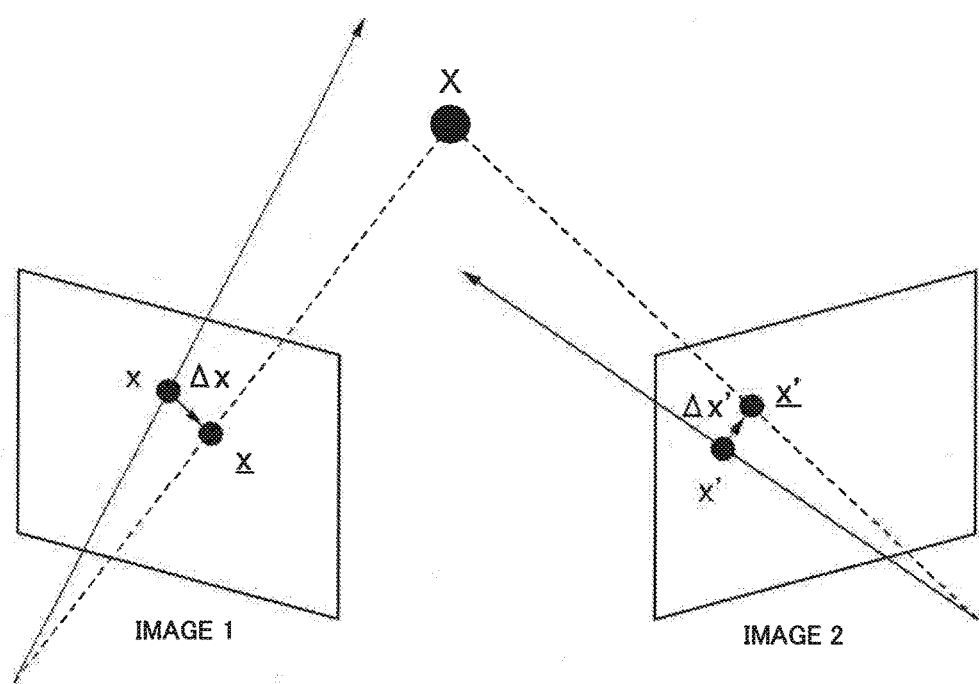
FIG. 3 is a schematic diagram of triangulation according to the disclosed subject matter.

First, an epipolar equation to be satisfied by image coordinates of optimum corresponding points will be described using FIG. 3. Image coordinates of corresponding points observed by respective cameras are hereinafter denoted as x and x', image coordinates of optimum corresponding points are denoted as $\underline{x}$ and $\underline{x}'$, and correction vectors optimizing the observed corresponding points are denoted as $\Delta x$ and $\Delta x'$. Further, intrinsic parameters of the cameras capturing the corresponding points are denoted as K and K', extrinsic parameters are denoted as [Rt] and [R't'], and optimum three-dimensional coordinates are denoted as X. Each of K and K' is a 3×3 (3-row, 3-column) matrix indicating a focal length and an optical center. Each of R and R' is a 3×3 (3-row, 3-column) rotation matrix, and each of t and t' is a three-dimensional translation vector. Since generality is not lost when a first camera is assumed to be a center of a three-dimensional coordinate system, it is hereinafter assumed that R is a 3×3 (3-row, 3-column) unit vector, and t is a zero vector. Further, $0_{m \times n}$ denotes an m×n (m-row, n-column) zero matrix or a zero vector, $I_{n \times n}$ denotes an n×n (n-row, n-column) unit matrix, a symbol (∥ ∥) having double lines in the front and the rear denotes an $L_2$ norm of a vector, $[\ ]_x$ denotes a matrix representation of a cross product of a three-dimensional vector, "det" denotes a determinant, a superscript T denotes a transpose of a matrix or a vector, a superscript "−1" denotes an inverse matrix, a superscript "−T" denotes a transpose of an inverse matrix, and ∞ denotes scale indeterminacy.

A known corresponding point search technology such as template matching or scale-invariant feature transform (SIFT) can be used to detect x and x'. Since each of x and x' includes an error caused by noise in a camera and the like, lines of sight (solid lines) do not have an intersection in a three-dimensional space, as illustrated in FIG. 3, and optimum three-dimensional coordinates X cannot be obtained. Accordingly, as described in the triangulation method described in NPL 3, optimum $\underline{x}$ and $\underline{x}'$ by which lines of sight (broken lines) intersect at a certain point, or correction vectors $\Delta x$ and $\Delta x'$ from observed coordinates to optimum coordinates may be obtained. $\Delta x$ and $\Delta x'$ are solutions of a constrained nonlinear optimization problem expressed by equation 1 in FIG. 4.

F in equation 1 is called a fundamental matrix and is known to have a feature that a determinant thereof $det(F)=0$, and a rank thereof is two. $\underline{F}$ is a matrix obtained by multiplying a fundamental matrix F by T and $T'^T$, and therefore, similarly to the fundamental matrix F, a determinant thereof is $det(\underline{F})=0$, and a rank thereof is two. The constraint in equation 1 is called an epipolar equation, and indicates that $\underline{x}=x-\Delta x$ agrees with $\underline{x}'=x'-\Delta x'$ in a three-dimensional space when the equation is satisfied.

Next, a method of solving the constrained nonlinear optimization problem in equation 1 will be described.

The constraint in equation 1 can be expressed by equation 2 in FIG. 5 using a vector b expressed using $F_{13}$ being an (i,j) element of the matrix F obtained by multiplying the fundamental matrix F by T and $T'^T$, and a matrix A. Since the right side of equation 2 is 0 from the constraint, multiplying both sides by a constant does not change the equation, and therefore, using a four-dimensional vector $v^T \infty [\Delta x^T, \Delta x'^T]$ and a constant k, equation 1 is equivalent to a constrained nonlinear optimization problem expressed by equation 3 in FIG. 6.

Expressing equation 3 by a Lagrangean function $L(v,k,\lambda)$ yields equation 4 in FIG. 6. An optimum solution of equation 4 satisfies equations 5 and 6 below being first-order optimality conditions (Karush-Kuhn-Tucker conditions).

$$\partial L/\partial v = v - \lambda(Av+kb) = 0_{4\times 1} \quad \text{equation 5}$$

$$\partial L/\partial k = k(b^T v + kc) = 0 \quad \text{equation 6}$$

Since $\lambda$ is nonzero, equation 7 is obtained from equation 6.

$$k = -b^T v/c \quad \text{equation 7}$$

Substituting equation 7 for equation 5 yields equation 8.

$$\lambda D v = v \quad \text{equation 8}$$

$$\text{where } D = A - bb^T/c \quad \text{equation 9}$$

D hereinafter denotes a constraint matrix for obtaining an optimum correction vector v.

Obtaining an inner product of both sides of equation 8 yields equation 10 in FIG. 6. Multiplying v by a constant does not change the value of equation 10. In other words, $\lambda$ may be understood to indicate relative magnitude of a correction amount of corresponding points in equation 3.

Further, denoting a reciprocal of $\lambda$ as $\mu = 1\lambda$ in equation 8 yields equation 11.

$$D v = \mu v \quad \text{equation 11}$$

Therefore, $\mu$ is an eigenvalue of D.

D is a 4×4 constraint matrix, and, as illustrated in FIG. 7, a determinant thereof $det(D)=0$, and a rank thereof is less than or equal to three.

One of solutions of equations 12 and 13 below is known to be $\infty$ and 0, respectively, obtained by the determinant $det(D)=0$. That is to say, a correction amount $\lambda$ or a reciprocal $\mu$ of the correction amount can be calculated as a solution of either characteristic equation with a decreased degree.

$$det(kD - I_{4\times 4}) = 0 \quad \text{equation 12}$$

$$det(D - \mu I_{4\times 4}) = 0 \quad \text{equation 13}$$

D is a real symmetric matrix, and therefore three nonzero eigenvalues are real numbers. An absolute minimum eigenvalue of the three eigenvalues may be selected in a case of k, and an absolute maximum eigenvalue of the three eigenvalues in a case of $\mu$.

In order to obtain all solutions of equation 12 or 13, for example, the characteristic polynomial calculation unit 11 may use Cardano's formula or Lagrange's formula that is expressed by a closed form. Further, in order to obtain only an absolute minimum or absolute maximum solution, Newton's method or a power method may be used.

Once $\lambda$ or $\mu$ is obtained, a correction vector v can be calculated as a corresponding eigenvector from equation 8 or 11. As a method of calculating an eigenvector when an eigenvalue is known, for example, the correction vector calculation unit 12 may solve $(\lambda D - I_{4\times 4})v = 0_{4\times 1}$ or $(D - I_{4\times 4})v = 0_{4\times 1}$ as simultaneous linear equations or by an inverse power method. An obtained eigenvector has indeterminacy with a scale factor of k, and therefore multiplying the eigenvector by 1/k by equation 7 yields $\Delta x$ and $\Delta x'$.

Corrected optimum corresponding points $\underline{x}$ and $\underline{x}'$ are computed by $\underline{x} = x - \Delta x$ and $\underline{x}' = x' - \Delta x'$. The corrected optimum corresponding points $\underline{x}$ and $\underline{x}'$ satisfy the epipolar equation, and therefore lines of sight intersect at a certain point in a three-dimensional space. In order to estimate three-dimensional coordinates X by a linear least squares method, for example, the three-dimensional coordinate calculation unit 2 may utilize the method described in NPLs 1 or 2.

Next, an operation of each unit according to the present example embodiment will be specifically described.

In Step S11, when image coordinates x and x' of observed corresponding points, intrinsic parameters K and K' of cameras capturing the corresponding points, and extrinsic parameters [Rt] and [R't'] are received, the characteristic polynomial calculation unit 11 first calculates a constraint matrix D expressed by equation 9. Next, the characteristic polynomial calculation unit 11 solves a characteristic polynomial expressed by either equation 12 or 13, calculates a correction amount $\lambda$ or a reciprocal $\mu$ of the correction amount, and outputs $\lambda$ or $\mu$ to the correction vector calculation unit 12 along with the constraint matrix D.

For example, intrinsic parameters and extrinsic parameters of cameras can be acquired by calibration using plane lattice images caught by two cameras, three-dimensional coordinates of the lattice point being known. Further, for example, the parameters may be acquired using a method called self-calibration using a plurality of corresponding points acquired by template matching, SIFT, or the like.

In Step S12, using a constraint matrix D, and a correction amount $\lambda$ or a reciprocal $\mu$ of the correction amount that are output from the characteristic polynomial calculation unit 11, the correction vector calculation unit 12 first calculates an eigenvector v corresponding to the correction amount or a reciprocal of the correction amount expressed by equation 8 or equation 11. Next, the correction vector calculation unit 12 obtains k by equation 7 and calculates correction vectors by determining the first and second elements of $(1/k)v$ obtained by multiplying the eigenvector v by 1/k as $\Delta x$, and the third and fourth elements as $\Delta x'$. Next, the correction vector calculation unit 12 calculates optimum corresponding points $\underline{x}$ and $\underline{x}'$ from the correction vectors and the image coordinates of the observed corresponding points, and outputs x and x' to the three-dimensional coordinate calculation unit 2.

In Step S13, the three-dimensional coordinate calculation unit 2 receives optimum corresponding points that are output by the correction vector calculation unit 12, and intrinsic parameters and extrinsic parameters of the cameras capturing the corresponding point. For example, the three-dimensional coordinate calculation unit 2 calculates three-dimensional coordinates X of the corresponding point by a linear least squares method, utilizing the method described in NPL 1 or 2.

The present example embodiment calculates optimum corresponding points $\underline{x}$ and $\underline{x}'$ after calculating correction vectors $\Delta x$ and $\Delta x'$. However, the disclosed subject matter may calculate optimum corresponding points $\underline{x}$ and $\underline{x}'$ without calculating correction vectors $\Delta x$ and $\Delta x'$. In this case, $\Delta x$ and $\Delta x'$ in the description above may be respectively replaced with $x-\underline{x}$ and $x'-\underline{x}'$, and each unit may perform similar calculation.

While the characteristic polynomial calculation unit 11 according to the present example embodiment calculates a constraint matrix D in accordance with equation 9, a numerical calculation may become unstable when an absolute value of $c=2\underline{F}_{3,3}$ is small, and therefore the right side of equation 9 may be multiplied by c to be determined as the constraint matrix D. In this case, a correction amount $\lambda$ being an eigenvalue, or a reciprocal $\mu$ of the correction amount is also multiplied by c; however, an eigenvector does not change, and therefore the operation of the correction vector calculation unit 12 does not change.

Further, when an absolute value of c is extremely close to zero, the characteristic polynomial calculation unit 11 may omit subsequent processing and output $v=0_{4\times 1}$ to the correction vector calculation unit. Closeness to zero may be determined by, for example, setting a threshold value such as $1e^{-10}$ in advance, or setting a machine epsilon as a threshold value. In this case, the characteristic polynomial calculation unit 11 accepts the threshold value as an input.

For example, the optimum corresponding point coordinate estimation unit 1 according to the present example embodiment is able to solve a third-degree characteristic equation to obtain an eigenvalue of a constraint matrix D, and then obtain an eigenvector corresponding to the eigenvalue. However, the present example embodiment is not limited thereto. For example, a Jacobi method or a Householder method that simultaneously obtains an eigenvalue and an eigenvector may be used.

[Effects of First Example Embodiment]

As described above, first, the triangulation device according to the present example embodiment is able to reduce a degree of a characteristic polynomial in calculation of correction vectors required for image coordinates of observed corresponding points to satisfy an epipolar equation, and, for example, the solution can be obtained by a third-degree equation. That is to say, the triangulation device according to the present example embodiment does not need to solve a sixth-degree equation by a complicated iterative method as is the case with NPL 3. Further, a solution expressed by a known closed form can be utilized for a third-degree equation, and therefore there is no need to use an iterative method with an increased computational amount, such as a DKA method or an eigenvalue decomposition method.

Furthermore, correction vectors obtained by the triangulation device according to the present example embodiment have guaranteed global optimality. The reason is that an epipolar equation is not approximated as is the case with NPL 4 or 5, and a solution globally minimizing a reprojection error can be selected from solutions of a third-degree equation. In other words, an eigenvalue of a constraint matrix minimizing a correction amount can be selected.

Accordingly, the triangulation device according to the present example embodiment is able to provide globally optimum triangulation with a small computational amount.

Second Example Embodiment

Figure 8:
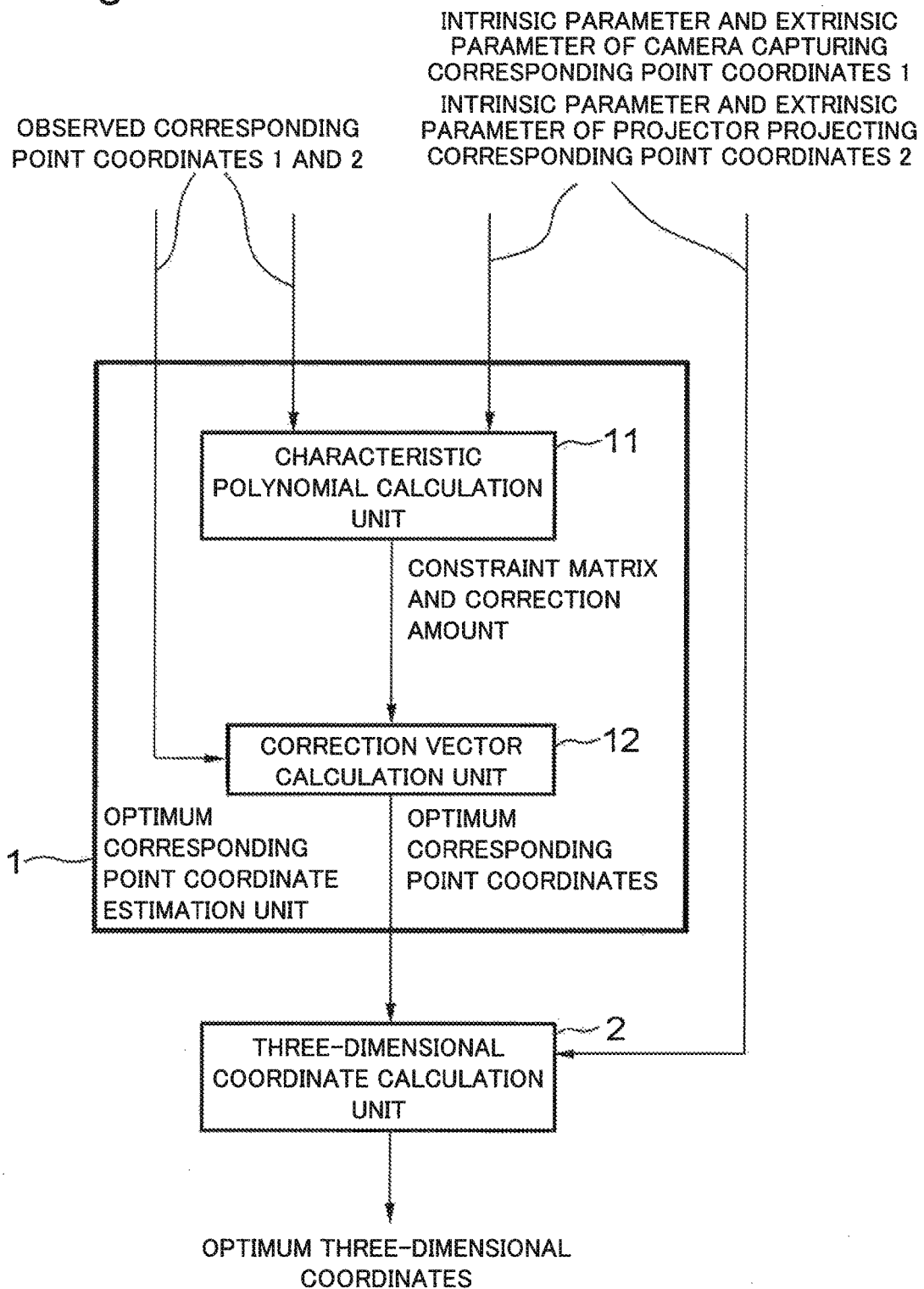
FIG. 8 is a block diagram illustrating a configuration of a triangulation device according to a second example embodiment.

FIG. 8 is a block diagram illustrating a configuration of a triangulation device according to a second example embodiment of the disclosed subject matter. The triangulation device according to the present example embodiment differs from the configuration according to the first example embodiment illustrated in FIG. 1 in that observed corresponding point coordinates (2) are two-dimensional coordinates projected by a projector. Further, there is another difference that an optimum corresponding point coordinate estimation unit 1 and a three-dimensional coordinate calculation unit 2 accept an intrinsic parameter and an extrinsic parameter of the projector. The remaining configuration is similar to that of the first example embodiment, and therefore description thereof is omitted.

According to the present example embodiment, an image is projected by a calibrated projector, the projected image is captured by a calibrated camera, and a corresponding point is generated. For example, the triangulation device detects a corresponding point from the image captured by the camera, using a known corresponding point search technology such as template matching or SIFT, assuming that the projected image is known. The triangulation device may assume image coordinates of the corresponding point as observed corresponding point coordinates (1) and a direction projected by the projector as observed corresponding point coordinates (2). While the direction projected by the projector is a three-dimensional vector, a length thereof is indeterminate, and therefore there are only two independent dimensions, and the direction can be treated as corresponding point coordinates.

In an operation of the triangulation device according to the present example embodiment, observed corresponding point coordinates (2) are two-dimensional coordinates projected by a projector. The operation is similar to the operation according to the first example embodiment except that an intrinsic parameter and an extrinsic parameter of the projector are supplied to the optimum corresponding point coordinate estimation unit 1 and the three-dimensional coordinate calculation unit 2, and therefore description thereof is omitted.

The triangulation device according to the present example embodiment is able to provide globally optimum triangulation with a small computational amount in a so-called active stereo method composed of a camera and a projector. The reason is that difference between light projection and image capture is merely difference in a sign of direction, and the two can be treated mathematically equivalent, and therefore a method similar to the first example embodiment can be applied.

Figure 9:
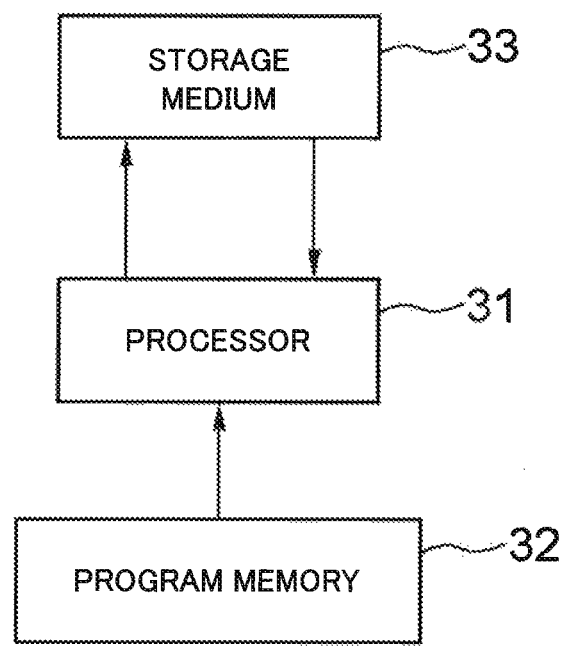
FIG. 9 is a block diagram in a case that the triangulation device according to the disclosed subject matter is implemented on an information processing system.

Additionally, for example, the triangulation device according to each of the aforementioned example embodiments can be provided by hardware or the like corresponding to each unit, and also by an information processing system. FIG. 9 is a block diagram in a case that the triangulation device according to the disclosed subject matter is implemented on an information processing system. The information processing system illustrated in FIG. 9 is a common information processing system including a processor 31, a program memory 32, and a storage medium 33. The storage medium 33 may be a storage area composed of separate storage media or a storage area composed of a single storage medium. Magnetic storage media such as a random access memory (RAM) and a hard disk may be used as the storage medium.

The program memory 32 stores a program for causing the processor 31 to perform processing in the respective aforementioned units of the optimum corresponding point coordinate estimation unit 1 (more specifically, a characteristic polynomial calculation unit 11 and a correction vector calculation unit 12) and the three-dimensional coordinate calculation unit 2. The processor 31 operates in accordance with the program. For example, the processor 31 may be a processor such as a CPU that operates in accordance with a program. Thus, the present example embodiment may also be provided by a computer program. It is not required to cause every part that can be operated by a program (such as the optimum corresponding point coordinate estimation unit 1 and the three-dimensional coordinate calculation unit 2) to be operated by a program, and some part may be configured by hardware. Further, each part may be provided as a separate unit.

Third Example Embodiment

Figure 10:
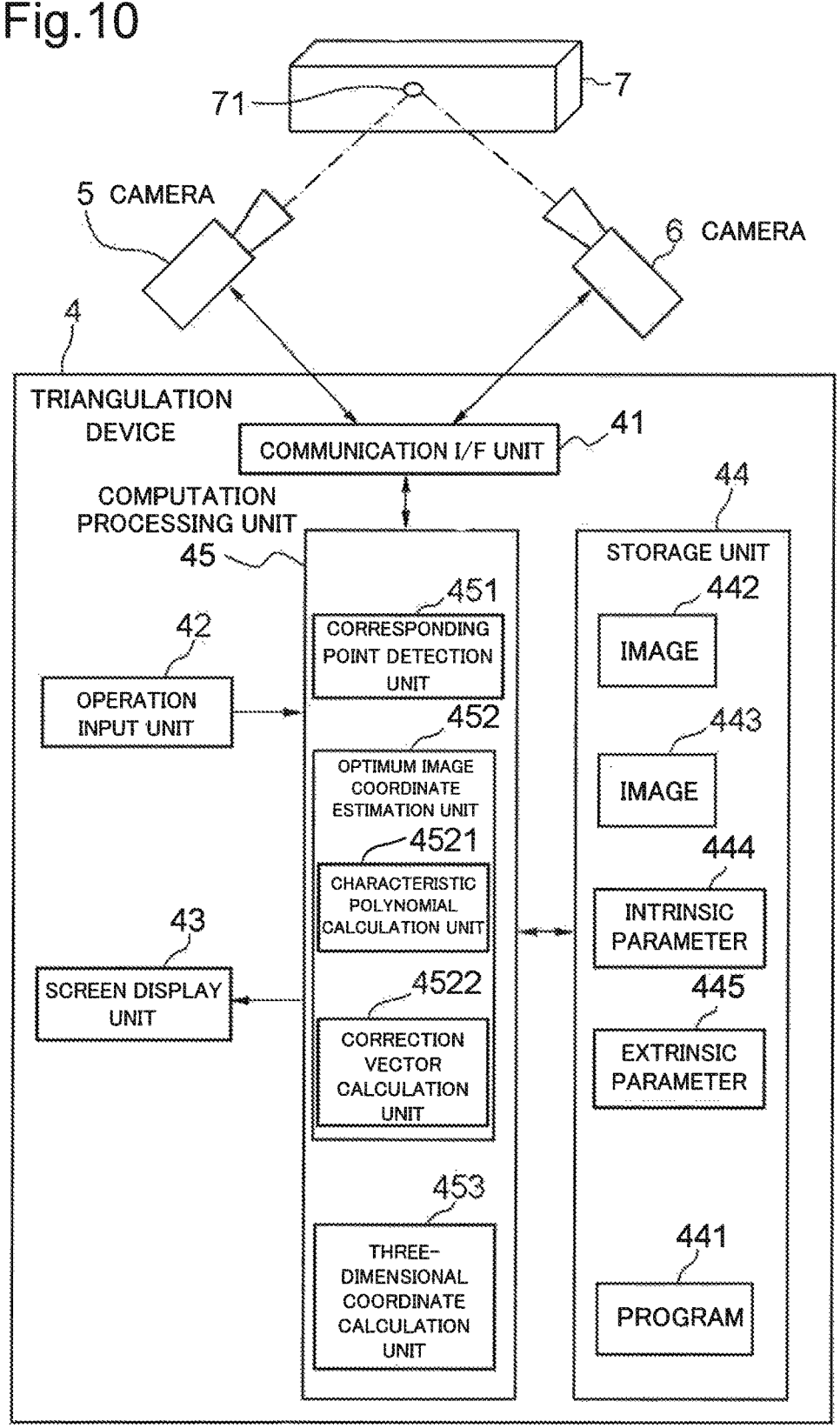
FIG. 10 is a block diagram illustrating a configuration of a triangulation device according to a third example embodiment.

With reference to FIG. 10, a triangulation device 4 according to a third example embodiment of the disclosed subject matter is an information processing device computing a three-dimensional position of a measurement target point 71 on a structure 7 such as a bridge using a passive stereo method. The triangulation device 4 is coupled in a wired or wireless manner to two cameras 5 and 6 capturing images of the structure 7 including the measurement target point 71 from mutually different positions. The two cameras 5 and 6 are composed of charge coupled device (CCD) cameras or the like, and both cameras are calibrated.

The triangulation device 4 includes a communication interface unit (communication I/F unit) 41, an operation input unit 42, a screen display unit 43, a storage unit 44, and a computation processing unit 45.

The communication I/F unit 41 is composed of a dedicated data communication circuit, and has a function of performing data communication with various types of devices such as the cameras 5 and 6 coupled through a wired or wireless communication line.

The operation input unit 42 is composed of operation input devices such as a keyboard and a mouse, and has a function of detecting an operation by an operator and outputting the operation to the computation processing unit 45.

The screen display unit 43 is composed of a screen display device such as a liquid crystal display (LCD) or a plasma display panel (PDP), and has a function of displaying a three-dimensional position of the measurement target point 71 and the like on the screen in response to an instruction from the computation processing unit 45.

The storage unit 44 is composed of storage devices such as a hard disk and a memory, and has a function of storing processing information required for various types of processing in the computation processing unit 45, and a program 441. The program 441 is a program providing various types of processing units by being read into and executed by the computation processing unit 45, and is read in advance from an external device (unillustrated) or a storage medium (unillustrated) through a data input-output function such as the communication I/F unit 41 to be saved into the storage unit 44. Main processing information stored in the storage unit 44 includes images 442 and 443, an intrinsic parameter 444, and an extrinsic parameter 445.

The image 442 is an image of the structure 7 including the measurement target point 71, being captured by the camera 5. The image 443 is an image of the structure 7 including the measurement target point 71, being captured by the camera 6. The intrinsic parameter 444 is a parameter indicating a characteristic of image formation in each camera such as a focal length, an image center, or a pixel size of each of the cameras 5 and 6. The extrinsic parameter 445 is a parameter indicating a position, an attitude, or the like of each of the two cameras 5 and 6.

The computation processing unit 45 includes a microprocessor and a peripheral circuit thereof, and has a function of causing the hardware to cooperate with the program 441 to provide various types of processing units, by reading the program 441 from the storage unit 44 and executing the program. Main processing units provided by the computation processing unit 45 include a corresponding point detection unit 451, an optimum image coordinate estimation unit 452, and a three-dimensional coordinate calculation unit 453.

The corresponding point detection unit 451 reads images 442 and 443 captured by the cameras 5 and 6 from the storage unit 44. Then, the corresponding point detection unit 451 has a function of detecting image coordinates corresponding to the measurement target point 71 in the image 442 of the camera 5 and image coordinates corresponding to the measurement target point 71 in the image 443 of the camera 6, using a known corresponding point search technique such as template matching or SIFT.

The optimum image coordinate estimation unit 452 receives coordinates of corresponding points corresponding to the measurement target point 71 in images 442 and 443 from the corresponding point detection unit 451, and receives the intrinsic parameters 444 the extrinsic parameters 445 from the storage unit 44. The optimum image coordinate estimation unit 452 has a function of outputting coordinates of corrected corresponding points corresponding to the measurement target point 71 in the images 442 and 443. The optimum image coordinate estimation unit 452 calculates correction vectors by which coordinates of corrected corresponding points satisfy an epipolar equation composed of the intrinsic parameters 444 and the extrinsic parameters 445, and outputs the coordinates of the corrected corresponding points. The correction vectors are calculated based on a predetermined polynomial including a correction amount of the coordinates of the corresponding points or a reciprocal of the correction amount as a variable.

The optimum image coordinate estimation unit 452 includes a characteristic polynomial calculation unit 4521 and a correction vector calculation unit 4522. The characteristic polynomial calculation unit 4521 calculates a predetermined constraint matrix indicating a constraint to be satisfied by correction vectors and including a correction amount of coordinates of corresponding points or a reciprocal of the correction amount as an eigenvalue. The predetermined constraint matrix is calculated based on coordinates of corresponding points receive from the corresponding point detection unit 451, and the intrinsic parameters 444 and the extrinsic parameters 445 receive from the storage unit 44. The characteristic polynomial calculation unit 4521 has a function of solving a characteristic equation of the constraint matrix and computing a minimum correction amount. Further, the correction vector calculation unit 4522 calculates an eigenvector of the constraint matrix corresponding to the minimum correction amount, based on the coordinates of the corresponding points receive from the corresponding point detection unit 451, and the constraint matrix and the minimum correction amount that are calculated by the characteristic polynomial calculation unit 4521. Additionally, the correction vector calculation unit 4522 has a function of performing predetermined scaling on the eigenvector to calculate correction vectors, calculating coordinates of corrected corresponding points from the correction vectors, and outputting the coordinates.

The three-dimensional coordinate calculation unit 453 has a function of receiving coordinates of corrected corresponding points from the optimum image coordinate estimation unit 452, receiving the intrinsic parameters 444 and the extrinsic parameters 445 from the storage unit 44, and calculating three-dimensional coordinates of the measurement target point 71. Further, the three-dimensional coordinate calculation unit 453 has a function of outputting the calculated three-dimensional coordinates of the measurement target point 71 to the screen display unit 43 and also transmitting the coordinates to another terminal (unillustrated) through the communication I/F unit 41.

Figure 11:
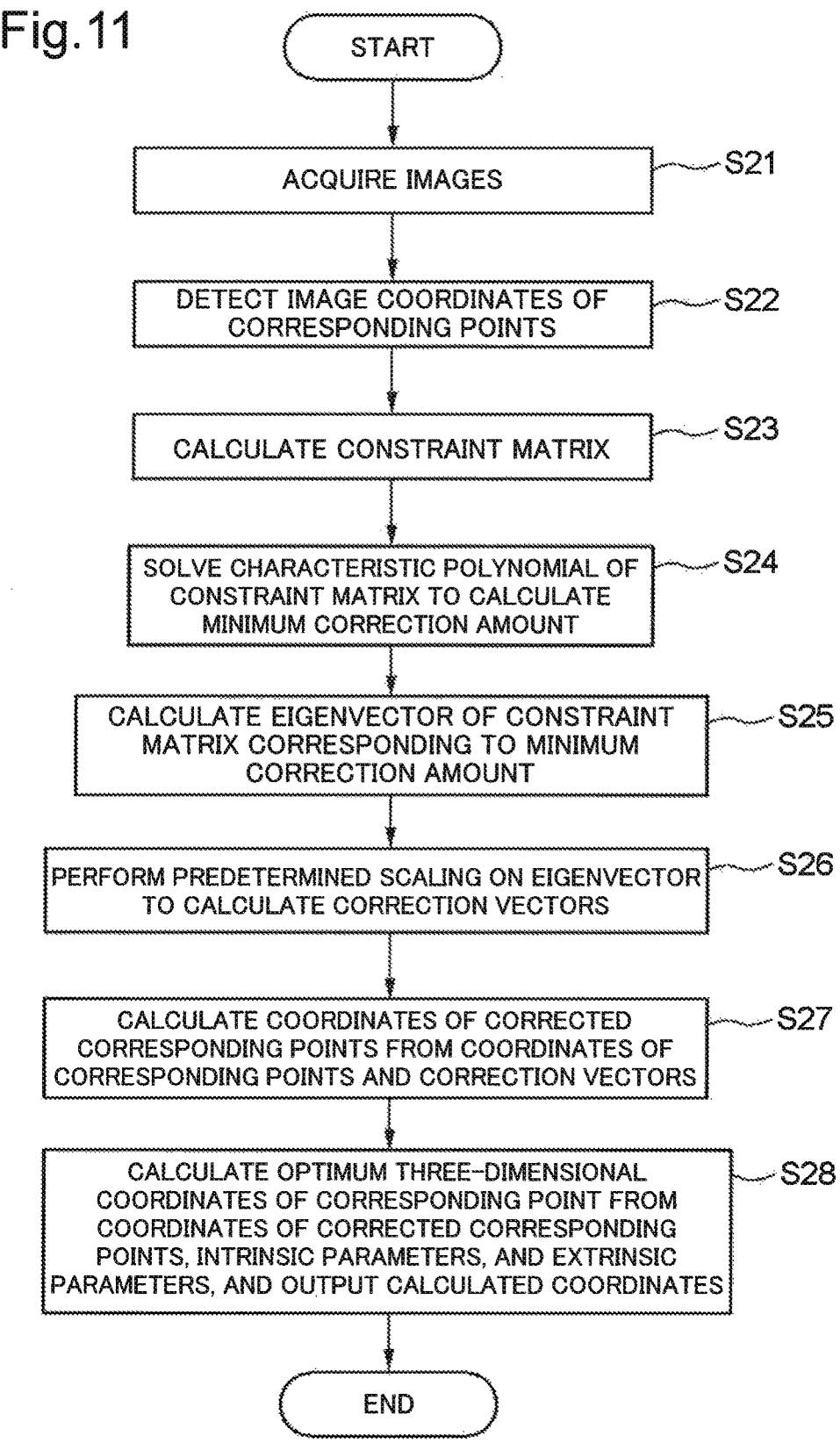
FIG. 11 is a flowchart illustrating an example of an operation of the triangulation device according to the third example embodiment.

FIG. 11 is a flowchart illustrating an example of an operation of the triangulation device 4 according to the present example embodiment. The operation of the triangulation device 4 according to the present example embodiment will be described below with reference to FIG. 11.

The corresponding point detection unit 451 in the triangulation device 4 captures images including the measurement target point 71 by the cameras 5 and 6, receives the captured images from the cameras 5 and 6 at the communication I/F unit 41, and stores the images in the storage unit 44 as images 442 and 443 (Step S21). Next, the corresponding point detection unit 451 detects image coordinates of corresponding points corresponding to the measurement target point 71 in the images 442 and 443 captured by the cameras 5 and 6, and conveys the coordinates to the optimum image coordinate estimation unit 452 (Step S22).

Next, the characteristic polynomial calculation unit 4521 in the optimum image coordinate estimation unit 452 calculates a predetermined constraint matrix (corresponding to D in aforementioned equation 9) from the intrinsic parameters 444, the extrinsic parameters 445, and the detected image coordinates of the corresponding points (Step S23). Next, the characteristic polynomial calculation unit 4521 solves a characteristic equation of the constraint matrix to calculate a minimum correction amount (corresponding to the aforementioned correction amount $\lambda$ or a reciprocal $\mu$ thereof) (Step S24). One of solutions of equations 12 and 13 being characteristic polynomials of the constraint matrix is known to be $\infty$ and 0, respectively, obtained by a determinant det(D)=0. That is to say, the correction amount $\lambda$ or a reciprocal $\mu$ of the correction amount can be obtained as a solution of either characteristic polynomial with a decreased degree.

Next, the correction vector calculation unit 4522 calculates an eigenvector of the constraint matrix corresponding to the minimum correction amount (corresponding to the eigenvector v expressed in aforementioned equations 8 or 11) (Step S25). Next, the correction vector calculation unit 4522 performs predetermined scaling on the eigenvector to calculate correction vectors (corresponding to the aforementioned correction vector v [or $\Delta x$ and $\Delta x'$]) (Step S26). Next, the correction vector calculation unit 4522 calculates coordinates of corrected corresponding points from the coordinates of the corresponding points and the correction vectors, and conveys the calculated coordinates to the three-dimensional coordinate calculation unit 453 (Step S27).

Next, the three-dimensional coordinate calculation unit 453 calculates optimum three-dimensional coordinates of the corresponding point from the coordinates of the corrected corresponding points, the intrinsic parameters and the extrinsic parameter, using a linear least squares method, and outputs the calculated coordinates (Step S28).

Thus, the present example embodiment is able to calculate a globally optimum three-dimensional position with a small computational amount in a triangulation device computing a three-dimensional position of a measurement target point using a passive stereo method. The reason is similar to the description in Effects of First Example Embodiment. For example, a third-degree equation instead of a sixth-degree equation has only to be solved, and a solution globally minimizing a reprojection error can be selected from solutions of the third-degree equation.

Fourth Example Embodiment

Figure 12:
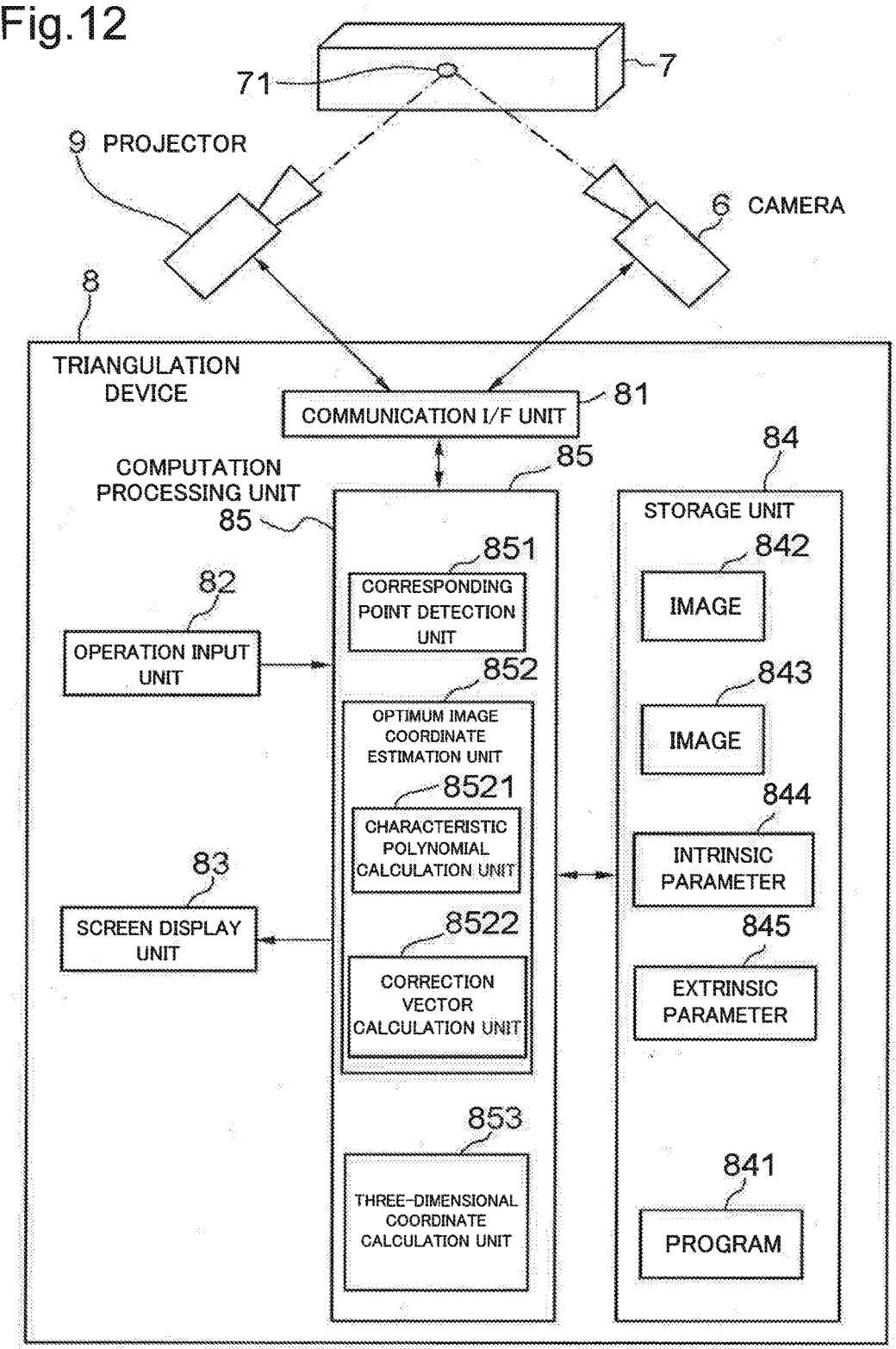
FIG. 12 is a block diagram illustrating a configuration of a triangulation device according to a fourth example embodiment.

With reference to FIG. 12, a triangulation device 8 according to a fourth example embodiment of the disclosed subject matter is an information processing device computing a three-dimensional position of a measurement target point 71 on a structure 7 such as a bridge using an active stereo method. The triangulation device 8 is coupled in a wired or wireless manner to a projector 9 projecting a predetermined image onto the structure 7, and a camera 6 capturing an image projected on the structure 7 by the projector 9.

The camera 6 is the same as the camera 6 illustrated in FIG. 10, and is calibrated. A spot laser projector or a slit laser projector may be used as the projector 9 but the projector is not limited thereto. When a spot laser projector is used, a high-intensity spot image is projected on a surface of the structure 7, and the location of the spot image becomes the measurement target point 71. Further, when a slit laser projector is used, a high-intensity slit image is projected on a surface of the structure 7, and the location of the slit image becomes the measurement target point 71. The projector 9 is calibrated.

The triangulation device 8 includes a communication interface unit (communication I/F unit) 81, an operation input unit 82, a screen display unit 83, a storage unit 84, and a computation processing unit 85. Among the units, the communication I/F unit 81, the operation input unit 82, and the screen display unit 83 respectively have functions similar to those of the communication I/F unit 41, the operation input unit 42, and the screen display unit 43, according to the third example embodiment, illustrated in FIG. 10.

The storage unit 84 is composed of storage devices such as a hard disk and a memory, and has a function of storing processing information required for various types of processing in the computation processing unit 85, and a program 841. The program 841 is a program providing various types of processing units by being read into and executed by the computation processing unit 85, and is read in advance from an external device (unillustrated) or a storage medium (unillustrated) through a data input-output function such as the communication I/F unit 81 to be saved into the storage unit 84. Main processing information stored in the storage unit 84 includes images 842 and 843, an intrinsic parameter 844, and an extrinsic parameter 845.

The image 842 is an image projected on the structure 7 including the measurement target point 71 by the projector 9. The image 843 is an image capturing, by the camera 6, an image projected on the structure 7 including the measurement target point 71 by the projector 9. The intrinsic parameter 844 is a parameter indicating a characteristic of image formation in the camera and the projector, such as a focal length, an image center, or a pixel size of the camera 6 and the projector 9. The extrinsic parameter 845 is a parameter indicating a position, an attitude, or the like of the camera 6 and the projector 9.

The computation processing unit 85 includes a microprocessor and a peripheral circuit thereof, and has a function of causing the hardware to cooperate with the program 841 to provide various types of processing units, by reading the program 841 from the storage unit 84 and executing the program. Main processing units provided by the computation processing unit 85 include a corresponding point detection unit 851, an optimum image coordinate estimation unit 852, and a three-dimensional coordinate calculation unit 853.

The corresponding point detection unit 851 has a function of reading an image 842 projected on the structure 7 by the projector 9 from the storage unit 84, and detecting image coordinates corresponding to the measurement target point 71 in the image 842 as coordinates of a corresponding point. Further, the corresponding point detection unit 851 has a function of reading an image 843 captured by the camera 6 from the storage unit 84, and detecting coordinates of a location with the highest intensity in the image as coordinates of a corresponding point. Naturally, a corresponding point may be detected from the image captured by the camera 6, using a known corresponding point search technology such as template matching or SIFT, assuming that the image projected by the projector 9 is known.

The optimum image coordinate estimation unit 852 has the following functions. That is to say, the optimum image coordinate estimation unit 852 receives coordinates of corresponding points corresponding to the measurement target point 71 in images 842 and 843 from the corresponding point detection unit 851, and receives the intrinsic parameters 844 and the extrinsic parameters 845 from the storage unit 84. Additionally, the optimum image coordinate estimation unit 852 outputs coordinates of corrected corresponding points corresponding to the measurement target point 71 in the images 842 and 843. The optimum image coordinate estimation unit 852 calculates correction vectors by which coordinates of corrected corresponding points satisfy an epipolar equation composed of the intrinsic parameters 844 and the extrinsic parameters 845, based on a predetermined polynomial including a correction amount of the coordinates of the corresponding points or a reciprocal of the correction amount as a variable, and outputs the coordinates of the corrected corresponding points.

The optimum image coordinate estimation unit 852 includes a characteristic polynomial calculation unit 8521 and a correction vector calculation unit 8522. The characteristic polynomial calculation unit 8521 has a function of calculating a predetermined constraint matrix that indicates a constraint to be satisfied by correction vectors and has a correction amount of coordinates of corresponding points or a reciprocal of the correction amount as an eigenvalue, and solving a characteristic equation of the constraint matrix to compute a minimum correction amount. The predetermined constraint matrix is calculated based on coordinates of corresponding points receive from the corresponding point detection unit 851, and the intrinsic parameters 844 and the extrinsic parameters 845 receive from the storage unit 84. Further, the correction vector calculation unit 8522 has a function of calculating an eigenvector of the constraint matrix corresponding to the minimum correction amount, performing predetermined scaling on the eigenvector to calculate correction vectors, calculating coordinates of corrected corresponding points from the correction vectors, and outputting the coordinates. The eigenvector of the constraint matrix is calculated based on the coordinates of the corresponding points receive from the corresponding point detection unit 851, and the constraint matrix and the minimum correction amount that are calculated by the characteristic polynomial calculation unit 8521.

The three-dimensional coordinate calculation unit 853 has a function of receiving coordinates of corrected corresponding points from the optimum image coordinate estimation unit 852, receiving the intrinsic parameters 844 and the extrinsic parameters 845 from the storage unit 84, and calculating three-dimensional coordinates of the measurement target point 71. Further, the three-dimensional coordinate calculation unit 853 has a function of outputting the calculated three-dimensional coordinates of the measurement target point 71 to the screen display unit 83, and also transmitting the coordinates to another terminal (unillustrated) through the communication I/F unit 81.

Figure 13:
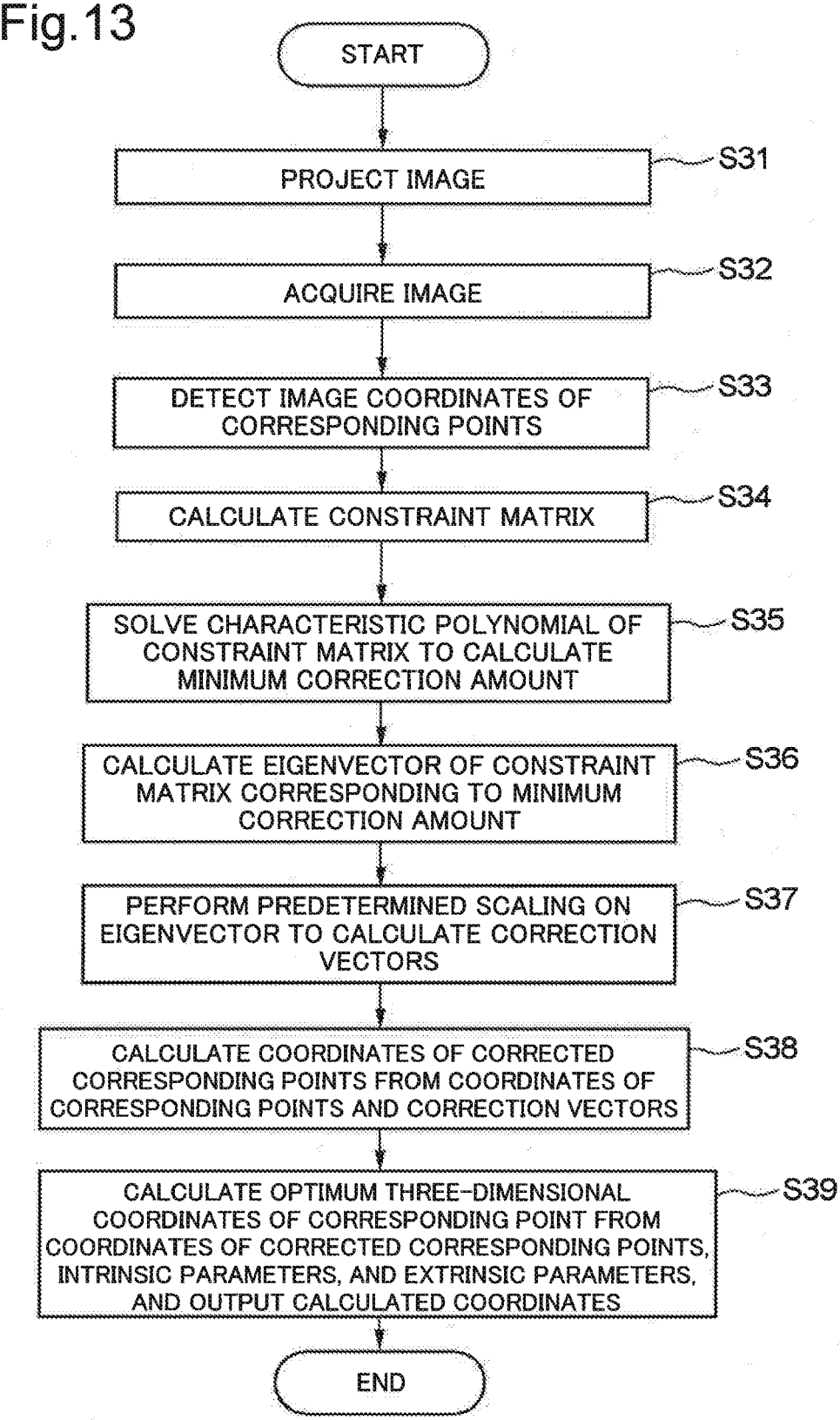
FIG. 13 is a flowchart illustrating an example of an operation of the triangulation device according to the fourth example embodiment.

FIG. 13 is a flowchart illustrating an example of an operation of the triangulation device 8 according to the present example embodiment. The operation of the triangulation device 8 according to the present example embodiment will be described below with reference to FIG. 13.

The corresponding point detection unit 851 in the triangulation device 4 transmits an image 842 read from the storage unit 84 to the projector 9 through the communication I/F unit 81, and projects the image 842 onto the structure 7 by the projector 9 (Step S31). Next, the corresponding point detection unit 851 captures, by the camera 6, an image including the image 842 projected on the structure 7, receives the captured image from the camera 6 at the communication I/F unit 81, and stores the image into the storage unit 84 as an image 843 (Step S32). Next, the corresponding point detection unit 851 detects image coordinates of corresponding points corresponding to the measurement target point 71 in the images 842 and 843, and conveys the coordinates to the optimum image coordinate estimation unit 852 (Step S33). Thereafter, processing similar to Steps S23 to S28 illustrated in FIG. 11 is performed (Steps S34 to S39).

Thus, the present example embodiment is able to calculate a globally optimum three-dimensional position with a small computational amount in a triangulation device computing a three-dimensional position of a measurement target point using an active stereo method. The reason is similar to the description in Effects of First Example Embodiment. For example, a third-degree equation instead of a sixth-degree equation has only to be solved, and a solution globally minimizing a reprojection error can be selected from solutions of the third-degree equation.

While the disclosed subject matter has been described above with reference to the example embodiments and examples, the disclosed subject matter is not limited to the aforementioned example embodiments and examples. Various changes and modifications that can be understood by a person skilled in the art may be made to the configurations and details of the disclosed subject matter, within the scope of the disclosed subject matter.

The disclosed subject matter is applicable to a use such as three-dimensional shape reconstruction from a plurality of images. This application claims priority based on Japanese Patent Application No. 2014-190242 filed on Sep. 18, 2014, the disclosure of which is hereby incorporated by reference thereto in its entirety.

The aforementioned example embodiments may also be described in part or in whole as the following Supplementary Notes but are not limited thereto.

[Supplementary Note 1]

A triangulation device for computing a three-dimensional position of a measurement target point using a stereo method, the triangulation device including:

a storage unit storing two images each of which including an image of the measurement target point, and intrinsic parameters and extrinsic parameters of optical instruments generating the images; and a processor coupled to the storage unit, wherein the processor is programmed to receive coordinates of corresponding points corresponding to the measurement target point in the two images, the intrinsic parameters and the extrinsic parameters, calculate correction vectors by which coordinates of the corrected corresponding points satisfy an epipolar equation composed of the intrinsic parameters and the extrinsic parameters, based on a third-degree polynomial including a correction amount of coordinates of the corresponding points or a reciprocal of the correction amount as a variable, compute coordinates of the corrected corresponding points, and calculate three-dimensional coordinates of the measurement target point, with coordinates of the corrected corresponding points, the intrinsic parameters and the extrinsic parameters as inputs.

[Supplementary Note 2]

The triangulation device according to Supplementary Note 1, wherein the processor is programmed to receive coordinates of the corresponding points, the intrinsic parameters and the extrinsic parameters, calculate a predetermined constraint matrix indicating a constraint to be satisfied by correction vectors and including a correction amount of coordinates of the corresponding points or a reciprocal of the correction amount as an eigenvalue, solve a characteristic equation of the constraint matrix to compute a minimum correction amount, calculate an eigenvector of the constraint matrix corresponding to the minimum correction amount, with coordinates of the corresponding points, the constraint matrix and the minimum correction amount as inputs, perform predetermined scaling on the eigenvector to calculate correction vectors, and calculate coordinates of the corrected corresponding points from the correction vectors.

[Supplementary Note 3]

The triangulation device according to Supplementary Note 1 or 2, wherein a correction amount of the corresponding points indicates a Lagrange multiplier in a constrained nonlinear optimization problem including magnitude of correction vectors as an objective function and an epipolar equation with scale indeterminacy as a constraint.

[Supplementary Note 4]

The triangulation device according to any one of Supplementary Notes 1 to 3, wherein the stereo method is a passive stereo method in which two images of the measurement target point are captured by cameras from different positions, respectively.

[Supplementary Note 5]

The triangulation device according to any one of Supplementary Notes 1 to 3, wherein the stereo method is an active stereo method in which an image of the measurement target point is projected by a projector from a certain position, and an image of the measurement target point is captured by a camera from another position.

[Supplementary Note 6]

The triangulation device according to Supplementary Note 2, wherein the predetermined constraint matrix is calculated by the following equation.

$$D = A - \frac{bb^T}{c} \quad \text{[Math. 1]}$$

where

D is a constraint matrix, $$A = \begin{bmatrix} 0 & 0 & \underline{F}_{1,1} & \underline{F}_{2,1} \\ 0 & 0 & \underline{F}_{1,2} & \underline{F}_{2,2} \\ \underline{F}_{1,1} & \underline{F}_{1,2} & 0 & 0 \\ \underline{F}_{2,1} & \underline{F}_{2,2} & 0 & 0 \end{bmatrix}$$

$$b = \begin{bmatrix} \underline{F}_{3,1} \\ \underline{F}_{3,2} \\ \underline{F}_{1,3} \\ \underline{F}_{2,3} \end{bmatrix}$$

$$c = 2\underline{F}_{2,3}$$

$\underline{F}_{i,j}$ is an (i,j) element of $\underline{F}$, $$\underline{F} = T'^T F T$$

$$T = \begin{bmatrix} I_{2\times2} & x \\ O_{1\times2} & 1 \end{bmatrix}$$

$$T' = \begin{bmatrix} I_{2\times2} & x' \\ O_{1\times2} & 1 \end{bmatrix}$$

F is a fundamental matrix determined by intrinsic parameters and extrinsic parameters, x and x' are coordinates of corresponding points, $I_{n\times n}$ is an n×n unit matrix, and $O_{m\times n}$ is an m×n zero matrix.

[Supplementary Note 7]

A triangulation method executed by a triangulation device that includes a storage unit storing two images each of which including an image of the measurement target point, and intrinsic parameters and extrinsic parameters of optical instruments generating the images, and a processor coupled to the storage unit, and computes a three-dimensional position of the measurement target point using a stereo method, the triangulation method including, by the processor:

receiving coordinates of corresponding points corresponding to the measurement target point in the two images, the intrinsic parameters and the extrinsic parameters;

calculating correction vectors by which coordinates of the corrected corresponding points satisfy an epipolar equation composed of the intrinsic parameters and the extrinsic parameters, based on a third-degree polynomial including a correction amount of coordinates of the corresponding points or a reciprocal of the correction amount as a variable;

computing coordinates of the corrected corresponding points; and calculating three-dimensional coordinates of the measurement target point, with coordinates of the corrected corresponding points, the intrinsic parameters and the extrinsic parameters as inputs.

[Supplementary Note 8]

The triangulation method according to Supplementary Note 7, wherein the processor receives coordinates of the corresponding points, the intrinsic parameters and the extrinsic parameters, calculates a predetermined constraint matrix indicating a constraint to be satisfied by correction vectors and including a correction amount of coordinates of the corresponding points or a reciprocal of the correction amount as an eigenvalue, solves a characteristic equation of the constraint matrix to compute a minimum correction amount, calculates an eigenvector of the constraint matrix corresponding to the minimum correction amount, with coordinates of the corresponding points, the constraint matrix and the minimum correction amount as inputs, performs predetermined scaling on the eigenvector to calculate correction vectors, and calculates coordinates of the corrected corresponding points from the correction vectors.

[Supplementary Note 9]

The triangulation method according to Supplementary Note 7 or 8, wherein a correction amount of the corresponding points indicates a Lagrange multiplier in a constrained nonlinear optimization problem including magnitude of correction vectors as an objective function and an epipolar equation with scale indeterminacy as a constraint.

[Supplementary Note 10]

The triangulation method according to any one of Supplementary Notes 7 to 9, wherein the stereo method is a passive stereo method in which two images of the measurement target point are captured by cameras from different positions, respectively.

[Supplementary Note 11]

The triangulation method according to any one of Supplementary Notes 7 to 9, wherein the stereo method is an active stereo method in which an image of the measurement target point is projected by a projector from a certain position, and an image of the measurement target point is captured by a camera from another position.

[Supplementary Note 12]

The triangulation method according to Supplementary Note 8, wherein the predetermined constraint matrix is calculated by the following equation.

$$D = A - \frac{bb^T}{c} \quad \text{[Math. 2]}$$

where

D is a constraint matrix, $$A = \begin{bmatrix} 0 & 0 & \underline{F}_{1,1} & \underline{F}_{2,1} \\ 0 & 0 & \underline{F}_{1,2} & \underline{F}_{2,2} \\ \underline{F}_{1,1} & \underline{F}_{1,2} & 0 & 0 \\ \underline{F}_{2,1} & \underline{F}_{2,2} & 0 & 0 \end{bmatrix}$$

$$b = \begin{bmatrix} \underline{F}_{3,1} \\ \underline{F}_{3,2} \\ \underline{F}_{1,3} \\ \underline{F}_{2,3} \end{bmatrix}$$

$$c = 2\underline{F}_{2,3}$$

$\underline{F}_{i,j}$ is an (i,j) element of $\underline{F}$, $$\underline{F} = T'^T F T$$

$$T = \begin{bmatrix} I_{2\times 2} & x \\ O_{1\times 2} & 1 \end{bmatrix}$$

$$T' = \begin{bmatrix} I_{2\times 2} & x' \\ O_{1\times 2} & 1 \end{bmatrix}$$

F is a fundamental matrix determined by intrinsic parameters and extrinsic parameters, x and x' are coordinates of corresponding points, $I_{n\times n}$ is an n×n unit matrix, and $0_{m\times n}$ is an m×n zero matrix.

[Supplementary Note 13]

A program for causing a processor in a triangulation device that includes a storage unit storing two images each of which including an image of a measurement target point, and intrinsic parameters and extrinsic parameters of optical instruments generating the images, and the processor coupled to the storage unit, and computes a three-dimensional position of the measurement target point using a stereo method, to:

receive coordinates of corresponding points corresponding to the measurement target point in the two images, the intrinsic parameters and the extrinsic parameters;

calculate correction vectors by which coordinates of the corrected corresponding points satisfy an epipolar equation composed of the intrinsic parameters and the extrinsic parameters, based on a third-degree polynomial including a correction amount of coordinates of the corresponding points or a reciprocal of the correction amount as a variable;

compute coordinates of corrected corresponding points; and calculate three-dimensional coordinates of the measurement target point, with coordinates of the corrected corresponding points, the intrinsic parameters and the extrinsic parameters as inputs.

[Supplementary Note 14]

The program according to Supplementary Note 13, wherein the processor receives coordinates of the corresponding points, the intrinsic parameters and the extrinsic parameters, calculates a predetermined constraint matrix indicating a constraint to be satisfied by correction vectors and including a correction amount of coordinates of the corresponding points or a reciprocal of the correction amount as an eigenvalue, solves a characteristic equation of the constraint matrix to calculate a minimum correction amount, calculates an eigenvector of the constraint matrix corresponding to the minimum correction amount, with coordinates of the corresponding points, the constraint matrix and the minimum correction amount as inputs, performs predetermined scaling on the eigenvector to calculate correction vectors, and calculates coordinates of the corrected corresponding points from the correction vectors.

[Supplementary Note 15]

The program according to Supplementary Note 13 or 14, wherein a correction amount of the corresponding points indicates a Lagrange multiplier in a constrained nonlinear optimization problem including magnitude of correction vectors as an objective function and an epipolar equation with scale indeterminacy as a constraint.

[Supplementary Note 16]

The program according to any one of Supplementary Notes 13 to 15, wherein the stereo method is a passive stereo method in which two images of the measurement target point are captured by cameras from different positions, respectively.

[Supplementary Note 17]

The program according to any one of Supplementary Notes 13 to 15, wherein the stereo method is an active stereo method in which an image of the measurement target point is projected by a projector from a certain position, and an image of the measurement target point is captured by a camera from another position.

[Supplementary Note 18]

The program according to Supplementary Note 14, wherein the predetermined constraint matrix is calculated by the following equation.

$$D = A - \frac{bb^T}{c} \quad \text{[Math. 3]}$$

where
D is a constraint matrix, $$A = \begin{bmatrix} 0 & 0 & \underline{F}_{1,1} & \underline{F}_{2,1} \\ 0 & 0 & \underline{F}_{1,2} & \underline{F}_{2,2} \\ \underline{F}_{1,1} & \underline{F}_{1,2} & 0 & 0 \\ \underline{F}_{2,1} & \underline{F}_{2,2} & 0 & 0 \end{bmatrix}$$

$$b = \begin{bmatrix} \underline{F}_{3,1} \\ \underline{F}_{3,2} \\ \underline{F}_{1,3} \\ \underline{F}_{2,3} \end{bmatrix}$$

$$c = 2\underline{F}_{2,3}$$

$\underline{F}_{i,j}$ is an (i,j) element of $\underline{F}$, $$\underline{F} = T'^T F T$$

$$T = \begin{bmatrix} I_{2\times 2} & x \\ O_{1\times 2} & 1 \end{bmatrix}$$

$$T' = \begin{bmatrix} I_{2\times 2} & x' \\ O_{1\times 2} & 1 \end{bmatrix}$$

F is a fundamental matrix determined by intrinsic parameters and extrinsic parameters,
x and x' are coordinates of corresponding points,
$I_{n\times n}$ is an n×n unit matrix, and
$0_{m\times n}$ is an m×n zero matrix.

REFERENCE SIGNS LIST

1 Optimum corresponding point coordinate estimation unit
11 Characteristic polynomial calculation unit
12 Correction vector calculation unit
2 Three-dimensional coordinate calculation unit
31 Processor
32 Program memory
33 Storage medium

What is claimed is:

1. A triangulation device for computing a three-dimensional position of a measurement target point using a stereo method, the triangulation device comprising:
   an optimum image coordinate estimation unit configured to,
      based on coordinates of corresponding points corresponding to the measurement target point in two images each of which including an image of the measurement target point, and intrinsic parameters and extrinsic parameters of optical instruments generating the two images, calculate correction vectors by which coordinates of corrected corresponding points satisfy an epipolar equation composed of the intrinsic parameters and the extrinsic parameters, using a characteristic polynomial including a correction amount of the coordinates of the corresponding points or a reciprocal of the correction amount as a variable, and
      compute the coordinates of the corrected corresponding points based on the calculated correction vectors; and
   a three-dimensional coordinate calculation unit configured to calculate three-dimensional coordinates of the measurement target point based on the coordinates of the corrected corresponding points, the intrinsic parameters and the extrinsic parameters.

2. The triangulation device according to claim 1, wherein the optimum image coordinate estimation unit includes:
   a characteristic polynomial calculation unit configured to
      receive the coordinates of the corresponding points, the intrinsic parameters and the extrinsic parameters,
      calculate a predetermined constraint matrix indicating a constraint to be satisfied by the correction vectors and including the correction amount of the coordinates of the corresponding points or the reciprocal of the correction amount as an eigenvalue, and
      solve a characteristic equation of the constraint matrix to compute a minimum correction amount; and
   a correction vector calculation unit configured to
      calculate an eigenvector of the constraint matrix corresponding to the minimum correction amount, with the coordinates of the corresponding points, the constraint matrix and the minimum correction amount as inputs,
      perform predetermined scaling on the eigenvector to calculate the correction vectors, and
      calculate the coordinates of the corrected corresponding points based on the correction vectors.

3. The triangulation device according to claim 1, wherein the correction amount of the corresponding points indicates a Lagrange multiplier in a constrained nonlinear optimization problem including magnitude of the correction vectors as an objective function and the epipolar equation with scale indeterminacy as a constraint.

4. The triangulation device according to claim 1, wherein the stereo method is a passive stereo method in which two images of the measurement target point are captured by cameras from different positions, respectively.

5. The triangulation device according to claim 1, wherein the stereo method is an active stereo method in which an image of the measurement target point is projected by a projector from a certain position, and an image of the measurement target point is captured by a camera from another position.

6. A triangulation method comprising, by a triangulation device:
   receiving coordinates of corresponding points corresponding to a measurement target point in images capturing a measurement target from two different positions, and intrinsic parameters and extrinsic parameters of optical instruments capturing the two images;
   calculating correction vectors by which coordinates of corrected corresponding points satisfy an epipolar equation composed of the intrinsic parameters and the extrinsic parameters, based on a characteristic polynomial including a correction amount of the coordinates of the corresponding points or a reciprocal of the correction amount as a variable;
   computing the coordinates of the corrected corresponding points based on the calculated correction vectors; and
   receiving the coordinates of the corrected corresponding points, the intrinsic parameters and the extrinsic parameters, and calculating three-dimensional coordinates of the measurement target point based on the coordinates of the corrected corresponding points, the intrinsic parameters and the extrinsic parameters.

7. The triangulation method according to claim 6, wherein the triangulation device
   receives the coordinates of the corresponding points, the intrinsic parameters and the extrinsic parameters,
   calculates a predetermined constraint matrix indicating a constraint to be satisfied by the correction vectors and including the correction amount of the coordinates of the corresponding points or the reciprocal of the correction amount as an eigenvalue,
   solves a characteristic equation of the constraint matrix to compute a minimum correction amount,
   calculates an eigenvector of the constraint matrix corresponding to the minimum correction amount, based on the coordinates of the corresponding points, the constraint matrix, and the minimum correction amount,
   performs predetermined scaling on the eigenvector to calculate the correction vectors, and
   calculates the coordinates of the corrected corresponding points based on the correction vectors.

8. The triangulation method according to claim 6, wherein the correction amount of the corresponding points indicates a Lagrange multiplier in a constrained nonlinear optimization problem including magnitude of the correction vectors as an objective function and the epipolar equation with scale indeterminacy as a constraint.

9. A non-transitory computer-readable recording medium storing a program causing a computer to function as:
   optimum image coordinate estimation unit configured to
      receive coordinates of corresponding points corresponding to a measurement target point in two images each of which including an image of the measurement target point, and intrinsic parameters and extrinsic parameters of optical instruments generating the two images,
      calculate correction vectors by which coordinates of corrected corresponding points satisfy an epipolar equation composed of the intrinsic parameters and the extrinsic parameters, based on a characteristic polynomial including a correction amount of the coordinates of the corresponding points or a reciprocal of the correction amount as a variable, and
      compute the coordinates of the corrected corresponding points based on the calculated correction vectors; and
   three-dimensional coordinate calculation unit configured to
      calculate three-dimensional coordinates of the measurement target point based on the coordinates of the corrected corresponding points, the intrinsic parameters and the extrinsic parameters.

10. The non-transitory computer-readable recording medium storing the program according to claim 9, wherein the optimum image coordinate estimation unit includes:
   characteristic polynomial calculation unit configured to
      calculate a predetermined constraint matrix indicating a constraint to be satisfied by the correction vectors and including the correction amount of the coordinates of the corresponding points or the reciprocal of the correction amount as an eigenvalue, based on the coordinates of the corresponding points, the intrinsic parameters and the extrinsic parameters, and
      solve a characteristic equation of the constraint matrix to compute a minimum correction amount; and
   correction vector calculation unit configured to
      calculate an eigenvector of the constraint matrix corresponding to the minimum correction amount, based on the coordinates of the corresponding points, the constraint matrix, and the minimum correction amount,
      perform predetermined scaling on the eigenvector to calculate the correction vectors, and
      calculate the coordinates of the corrected corresponding points based on the correction vectors.

* * * * *